(12) United States Patent
Benson et al.

(10) Patent No.: US 6,757,774 B1
(45) Date of Patent: Jun. 29, 2004

(54) HIGH-AVAILABILITY, HIGHLY-REDUNDANT STORAGE SYSTEM ENCLOSURE

(75) Inventors: Anthony J Benson, Roseville, CA (US); James J. DeBlanc, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 09/811,194

(22) Filed: Mar. 17, 2001

(51) Int. Cl.$^7$ .................................................. G06F 13/00
(52) U.S. Cl. ......................... 710/305; 710/313; 714/2; 714/22; 361/695
(58) Field of Search ........................... 710/305, 72, 300, 710/100, 306, 313, 301, 314; 714/2, 25, 22; 711/100, 112; 370/217, 225, 362, 360, 402; 361/724, 600, 683, 684, 687, 695; 713/300

(56) References Cited

U.S. PATENT DOCUMENTS

| | | | | |
|---|---|---|---|---|
| 4,955,020 A | * | 9/1990 | Stone et al. | |
| 5,754,804 A | * | 5/1998 | Cheselka et al. | |
| 6,078,503 A | * | 6/2000 | Gallagher et al. | |
| 6,614,752 B1 | * | 9/2003 | Parrish et al. | |

* cited by examiner

*Primary Examiner*—Gopal C. Ray

(57) ABSTRACT

An enclosure for a storage system includes a housing, redundant power supply slots for receiving one or more power supplies, redundant fan slots for receiving one or more fan cards, and redundant bus controller card slots for receiving one or more bus controller cards. The redundant controller card slots have a first backplane connector for coupling to an odd bus and a second backplane connector for coupling to an even bus. The odd bus and the even bus are accessible independently through the enclosure.

20 Claims, 7 Drawing Sheets

HIGH-AVAILABILITY, HIGHLY-REDUNDANT STORAGE SYSTEM ENCLOSURE

CROSS-REFERENCE

The present invention is related to subject matter disclosed in the following patent applications:

1. U.S. patent application Ser. No. 09/811,194 entitled, "Data Corruption Avoidance on a Backplane Bus Adapted to Receive Bus Controller Cards of Different Types", naming Anthony J. Benson and Patrick McGoey as inventors and filed on even date herewith.
2. U.S. patent application Ser. No. 09/811,193 entitled, "Multiple-Path Interface Card for Interfacing Multiple Isolated Interfaces to a Storage System", naming Anthony J. Benson and James J. deBlanc as inventors and filed on even date herewith.
3. U.S. patent application Ser. No. 09/811,194 entitled, "DIP Switch Configuration for Increased Usability with Multiple Cards", naming Anthony J. Benson, Chadi Theodossy, and Joanna Baisden as inventors and filed on even date herewith.
4. U.S. patent application Ser. No. 09/811,192 entitled, "Circuit for Switching One or More HVD Transceivers", naming Anthony J. Benson as inventor and filed on even date herewith,
5. U.S. patent application Ser. No. 09/810,963 entitled, "Management of Communication Bus Resets", naming Anthony J. Benson, James L. White, and Dovard K. Howard as inventors and filed on even date herewith.
6. U.S. patent application Ser. No. 09/811,196 entitled, "Communication Bus Controller Including Designation of Primary and Secondary Status According to Slot Position", naming Anthony J. Benson, James L. White, and Dovard K. Howard as inventors and filed on even date herewith.

BACKGROUND OF THE INVENTION

While business growth has been robust in the last few years, one of the largest areas of growth in many businesses has been the continuing increase in data handling and storage. With the increase in utilization of large database applications, improved processing power by single- and multiple-processor systems, and migration of multimedia applications into mainstream office tools, businesses and organizations have greatly increased their need for large amounts of storage.

Large volumes of data are only useful if the data can be accessed quickly and reliably. Increased reliability is commonly achieved by usage of redundant elements and by increasing availability. In high-availability applications, data must be constantly available with minimal planned and unplanned downtime. High availability is measured at the system level and quantified as the percentage of time the system is in a state to do useful work.

SUMMARY OF THE INVENTION

What is needed is a storage system that promotes reliability through usage of redundant, high-availability components.

A storage system promotes reliability and high-availability using a highly-redundant interface chassis and a multiple-path interface card that supports access to multiple buses on a backplane. In one example, a Small Computer System Interface (SCSI) disk enclosure has multiple redundant power supplies, multiple redundant cooling elements, and multiple interface cards. The interface cards are multiple-path interface cards. For example, two-path interface cards supply access to two buses on a backplane and has two connectors. Each connector has an isolated path to each bus on the backplane and termination on the card. Isolation of the connectors allows a user to disconnect cables from one connector without affecting the other connector.

In accordance with one aspect of the present invention, an enclosure includes a housing, redundant power supply slots for receiving and coupling to one or more power supplies, redundant fan slots for receiving and coupling to one or more fan cards, and redundant bus controller card slots for receiving and coupling to one or more bus controller cards. The individual redundant controller card slots have a first back plane connector for coupling to an odd bus and a second back plane connector for coupling to an even bus. The odd bus and even bus are accessible independently through the enclosure.

In accordance with another aspect of the present invention, a storage system includes one or more enclosures, and first and second buses. The enclosures include a housing, redundant power supply slots for receiving and coupling to one or more power supplies, redundant fan slots for receiving and coupling to one or more fan cards, and redundant bus controller card slots for receiving and coupling to one or more bus controller cards. The individual redundant controller card slots have a first back plane connector for coupling to an odd bus and a second back plane connector for coupling to an even bus. The odd bus and even bus are accessible independently through the enclosure. Inserted into the enclosures are one or more fans coupled to the redundant fan slots, one or more power supplies coupled to the redundant power supply slots, and one or more bus controller cards coupled to the redundant bus controller card slots. The first bus is coupled to the one or more enclosures and configured as an even bus. The second bus is coupled to the one or more enclosures and configured as an odd bus.

DESCRIPTION OF THE EMBODIMENT(S)

Although the illustrated examples depict interfaces to a Small Computer System Interface (SCSI) bus, and one or more host computers, other systems in accordance with other embodiments of the present invention may use other buses and/or serial bit stream data connections and host equipment.

Figure 1:
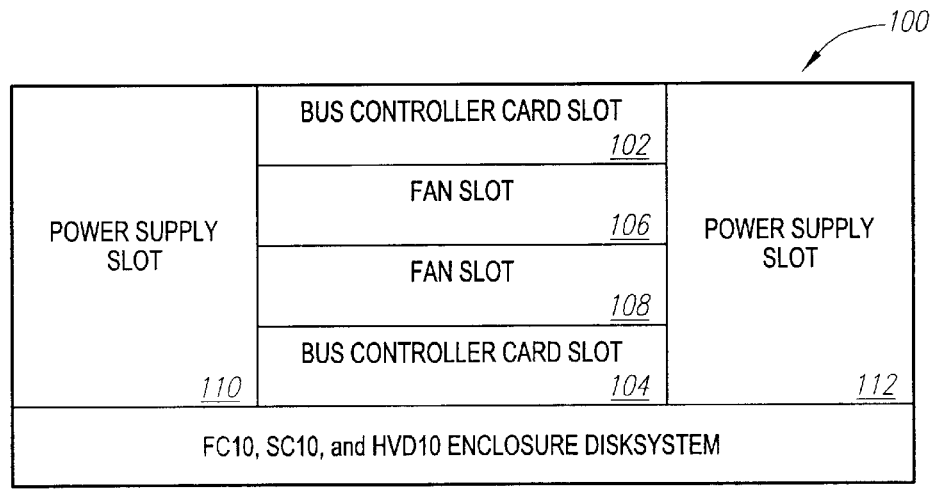
FIG. 1 is a highly schematic block diagram that illustrates an example of a Small Computer System Interface (SCSI) disk enclosure for a redundant, high availability storage system.

Referring to FIG. 1, a highly schematic block diagram illustrates an example of a Small Computer System Interface (SCSI) disk enclosure 100 for a redundant, high availability storage system. The SCSI disk enclosure 100 has multiple bus controller card (BCC) slots, for example two BCC slots 102 and 104, for connection to multiple SCSI buses. The SCSI disk enclosure 100 allows independent access to each SCSI bus and a capability to remove one bus controller card without affecting the operation of another bus controller card within the SCSI disk enclosure 100.

The illustrative SCSI disk enclosure 100 has two BCC slots 102 and 104 for holding two bus controller cards. Two fan slots 106 and 108, and two power supply slots 110 and 112 supply redundancy with respect to cooling and power within the SCSI disk enclosure 100. The SCSI disk enclosure 100 supports high availability through the application of hot-pluggable, user-replaceable, and optionally redundant BCCs, fans, and power supplies.

A system including one or more of the SCSI disk enclosures 100 and a suitable number of bus connector cards has a structure that supports one or more of several aspects of a redundant, high-availability storage system. The system supports an increased number of isolated bus connections to the SCSI bus. The structure permits a host system to switch access paths to the SCSI disk enclosure 100 and utilize an alternate bus controller card when a currently-used bus controller card encounters problems.

The structure supports an increase in the number of high-availability configurations for a single disk enclosure. High-availability is attained by a redundant structure in which components including power supplies, fans, bus controller cards, and disk storage modules are fully redundant. A typical type of storage module is a storage disk module. The components are "hot-swappable", facilitating access for replacement or reconfiguration while the system remains operational. The storage system remains operational and data remains available for access even during replacement of system components with no system downtime for repair.

The redundant, high-availability system structure supports monitoring and reporting functionality for a single disk disclosure using two bus controller cards with on-card monitoring and reporting circuitry, functioning in conjunction with monitoring software that is operable on a host system. The host system can be configured to perform various monitoring or control operations utilizing the redundant, high-availability aspects of the storage system. For example, a bus controller card can include diagnostic and control elements or circuits to perform the various operations. Alternatively, a lower-cost system may be produced without the control elements that forgoes the additional capabilities.

A bus controller card can be disconnected from the bus for performance of self-diagnostic operations. The system can identify a failing component within the SCSI disk enclosure 100. The system can detect and shut down a failing component within the SCSI disk enclosure 100, permitting continuing operation of other components. The system can include a capability to report to the host the failure of a component within the SCSI disk enclosure 100 and continue operation with reduced capabilities until repairs are made. The system can switch operations over to a backup bus controller card (BCC) if a primary BCC is in a monitor mode.

The architecture of the SCSI disk enclosure 100 permits two interface cards to be placed in the storage system, allowing independent removal of each card.

Figure 2:
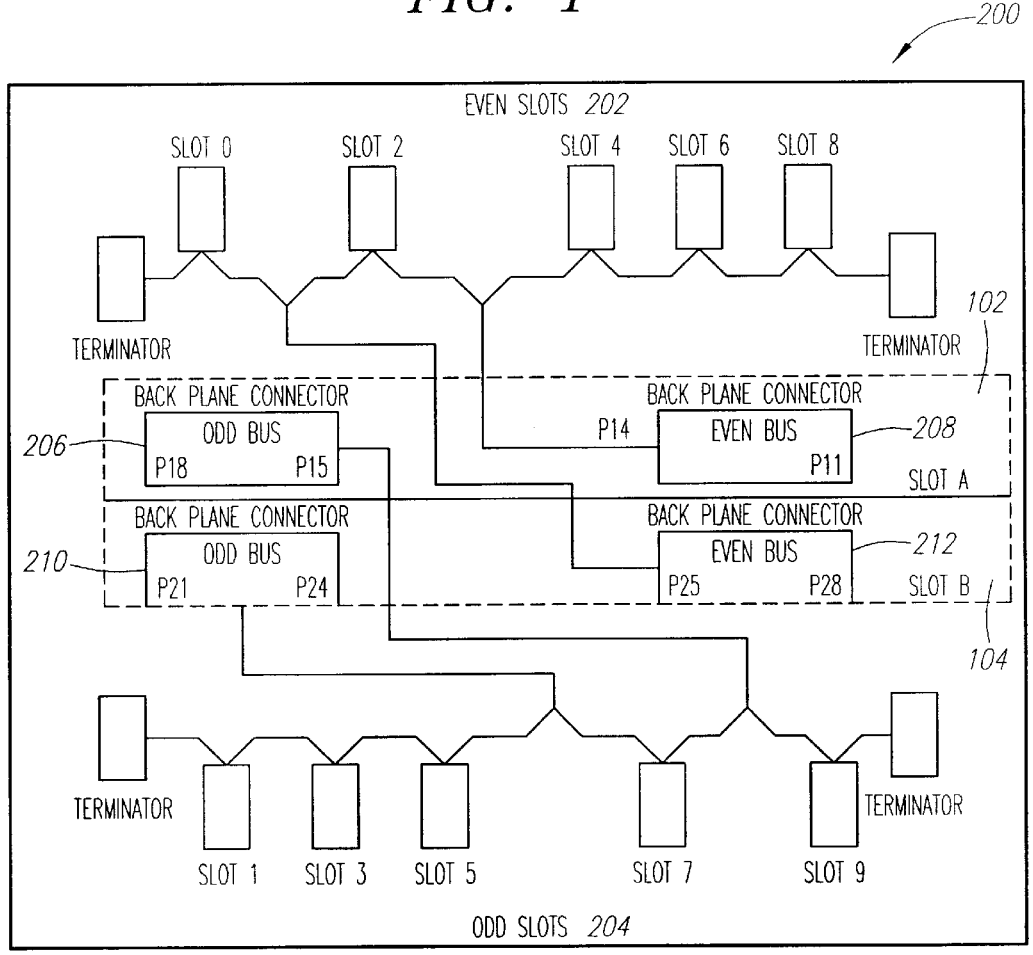
FIG. 2 is a schematic block diagram that illustrates a suitable backplane architecture that allows independent access to two SCSI buses supported on a mid-plane for even bus slots and odd bus slots.

Referring to FIG. 2, a schematic block diagram illustrates a suitable backplane architecture 200 that allows independent access to two SCSI buses supported on a mid-plane for each bus slot of even bus slots 202 and odd bus slots 204. The backplane architecture 200 includes two bus controller card slots A 102 and B 104, each having two backplane connectors of left side backplane connectors 206 and 210, and right side backplane connectors 208 and 212. Connections to the odd bus slots 204 are on the left side 206 and 210 of the backplane. Connections to the even bus slots 202 are on the right side 208 and 212 of the backplane. The position of the BCC in bus controller card slot A 102 is inserted in an orientation 180° from the orientation of the BCC inserted into the bus controller card slot B 104. Because the bus controller cards are rotated 180° when moved from BCC slot to adjacent BCC slot, the backplane connector associated with the even bus 222 when the BCC is inserted in BCC slot B 104 is connected to the odd bus 224 when inserted into BCC slot A 102.

Figure 3:
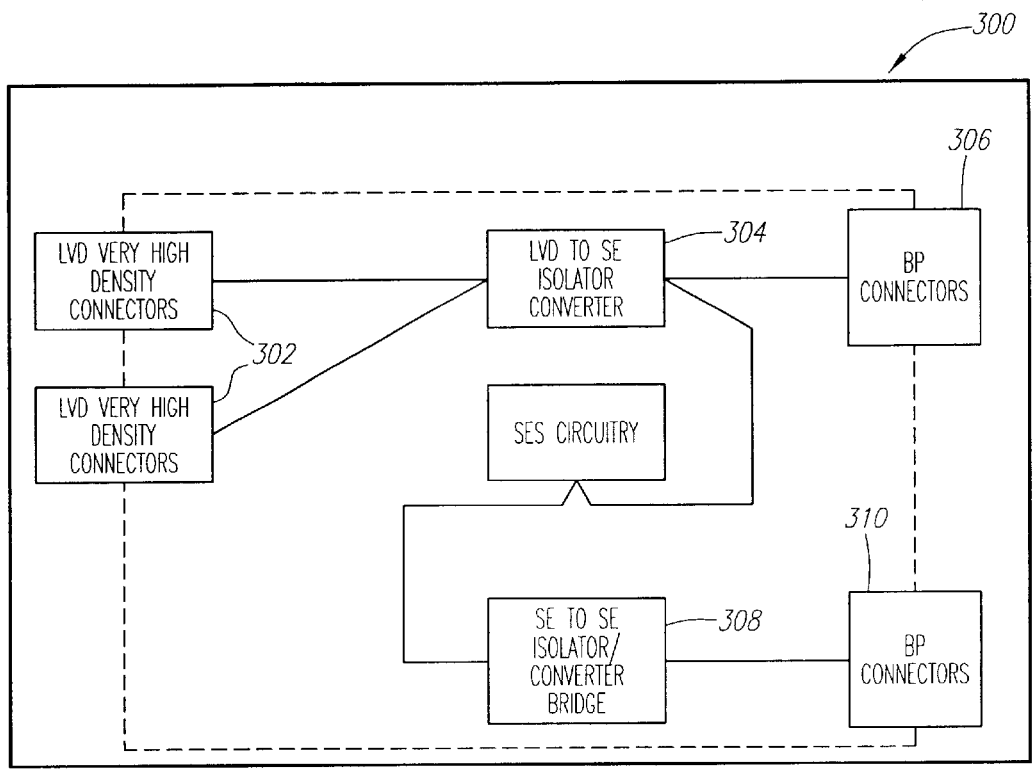
FIG. 3 is a schematic block diagram that illustrates, for purpose of comparison, a bus architecture that does not have the redundancy and high-availability capability.

Referring to FIG. 3, a schematic block diagram illustrates, for purpose of comparison, a bus architecture 300 that does not have the redundancy and high-availability capability of the illustrative system depicted in FIGS. 1 and 2. The bus architecture 300 does not allow independent access to each of the SCSI buses so that two bus controller cards are needed to access the two SCSI buses. Very high density connectors (VHDC) 302 on each BCC are tied together, making the two BCC interdependent but permitting external termination. A BCC in a top backplane connector 306 connects to the even bus and a BCC in a bottom backplane connector 310 connects to the odd bus. Each BCC can be operated in a split-bus configuration with only a single bus being accessible to each card, for example, to access a maximum of five disks. Alternatively, each BCC can be configured in a bridge mode in which the two buses are interconnected and a maximum of ten buses, for example, can be accessed.

The bus architecture 300 requires an external terminator if a BCC is at the end of the bus. An isolator/converter chip 304 or 308 is used to convert a low voltage differential (LVD) signal to single-ended, which is compatible with the backplane. LVD signaling filters common mode noise by taking the difference of two low-voltage signals.

The design of the bus architecture 300 allows daisy chaining using standard SCSI cables.

Figure 4:
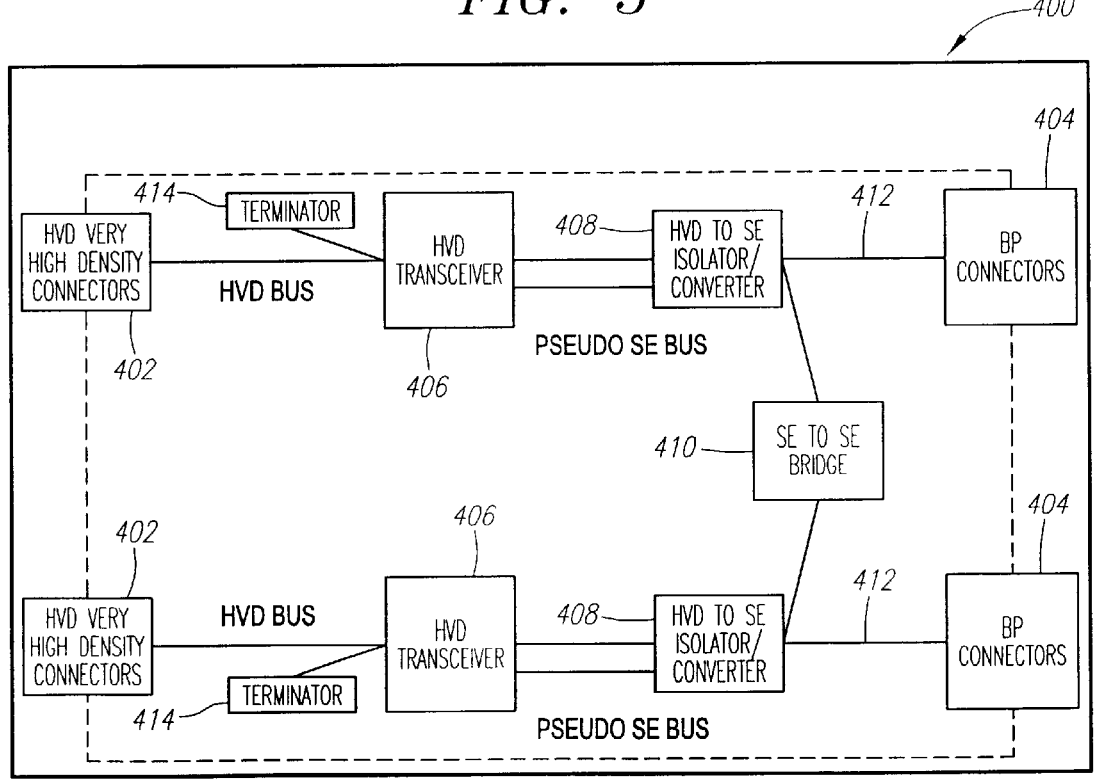
FIG. 4 is a schematic block diagram that shows an example of a high voltage differential (HVD) bus architecture that attains high redundancy and high availability.

Referring to FIG. 4, a schematic block diagram illustrates an example of a high voltage differential (HVD) bus architecture 400 that attains high redundancy and high availability. HVD supports data rates up to 20 Mbytes/sec in Fast Wide mode, or up to 40 Mbytes/sec in Ultra mode. A single HVD bus controller card permits independent access to each of the SCSI buses on the mid-plane. The two SCSI buses can be bridged together to allow host systems connected to each of two high-density, for example 68-pin, connector 402 access to all drives connected onto both SCSI buses. In the illustrative bus architecture 400, each high-density connector 402 is coupled to backplane connectors 404 via HVD transceivers 406 and HVD to single-ended (SE) converters 408. Single-ended signaling is a type of SCSI signaling that uses a single driver and receiver per signal. SE wide (16 bits) with Fast SCSI supports data rates up to 20 Mbytes/sec. SE Wide with Ultra SCSI supports data rates up to 40 Mbytes/sec.

In the HVD bus architecture 400, only a single BCC is necessary to access both of two SCSI buses connected to the backplane by the backplane connectors 404. The illustrative BCC includes two HVD high density connectors 402 and each connector 402 has an isolated path 412 to each bus with termination 414. A SE to SE bridge 410 connects the isolated two paths and supplies isolation between the paths 412. A suitable isolator is a SYM53C140 Ultra2 SCSI Bus Expander supplied by LSI Logic Corp. of Milpitas, Calif. The SYM53C140 Ultra2 SCSI Bus Expander connects single-ended (SE) Ultra, Low-Voltage Differential (LVD) Ultra2 or High-Voltage Differential (HVD) peripherals in any combination Isolation of the data paths 412 permits users to disconnect cables from one connector 402 without affecting signals on the other connector 402, and allows cable lengths to be increased since the SE to SE bridge resynchronizes and resends all signals. Termination can be enabled or disabled, depending on the desired configuration.

Internal termination 414 replaces the external termination that is required for non-isolated architectures. The internal termination 414 remains functional if access to the SCSI bus is denied due to improper configuration or even if power is terminated to the entire HVD disk system enclosure. Internal termination 414 can be disabled via a DIP switch (not shown) on a bus controller card.

Whether the HVD bus system is configured in split bus mode or full bus mode, connections made to the HVD BCC can be removed or disabled without affecting the other connection.

Figure 5:
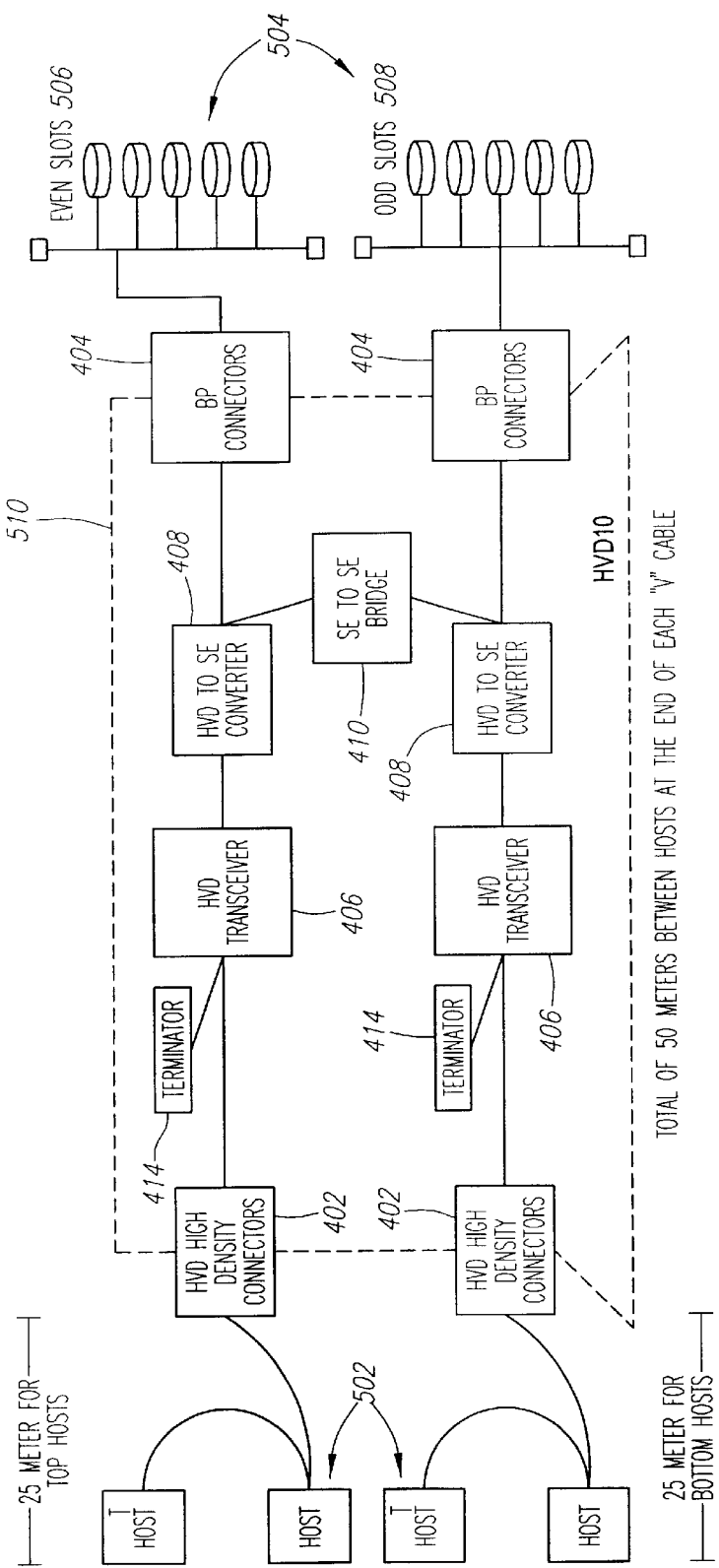
FIG. 5 is a schematic block diagram showing an example of a storage system that uses a HVD bus controller card (BCC) to connect multiple host computers to multiple storage units.

Referring to FIG. 5, a schematic block diagram illustrates an example of a storage system 500 that uses a HVD bus controller card (BCC) 510 to connect multiple host computers 502 to multiple storage units 504. Some of the storage units 504 are connected to even bus slots 506 and some to odd bus slots 508. The BCC 510 uses the internal bridge 410 to connect the even buses 506 and the odd buses 508 on a backplane. The BCC 510 can be configured in Full Bus, called Bridged, Mode to allow up to four hosts 502 to connect to the SCSI bus with an extended cabling distance of up to 25 meters for the host computers 502 and bus isolation. The internal bridge 410 can be disabled, resulting in a split-bus configuration limiting access to two hosts 502 per bus 506 or 508 with a maximum of five storage units 504 per bus.

Figure 6:
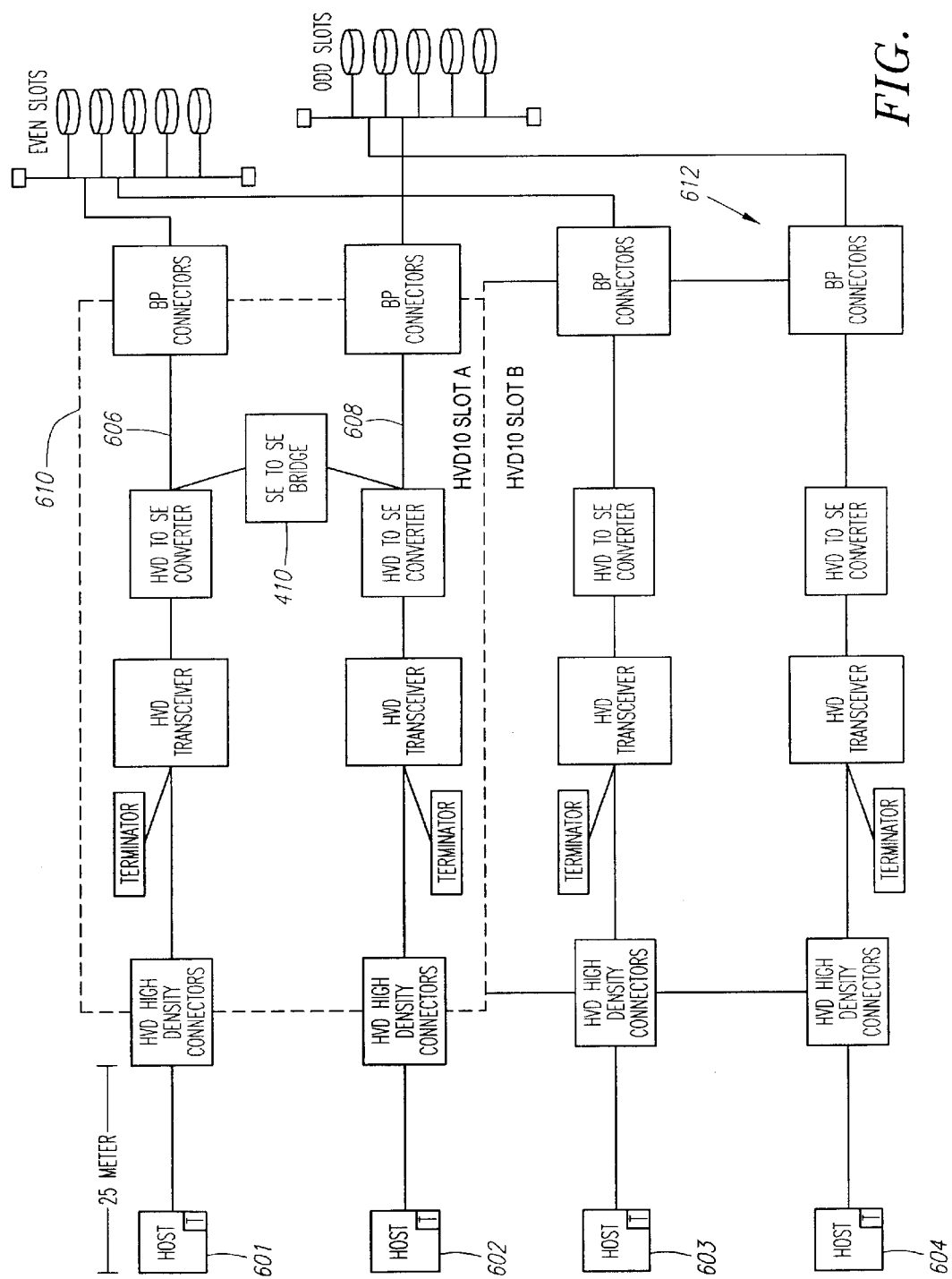
FIG. 6 is a schematic block diagram that shows a bus configuration constructed using two HVD bus controller cards.

A second HVD BCC can be added when the system is connected using the SCSI disk enclosure 100 shown in FIG. 1, increasing the host connect rate and supplying redundancy. No in-line terminators are necessary to disconnect a host 502 from the system 500. FIG. 6 shows a bus configuration 600 constructed using two HVD bus controller cards 610 and 612. Two host computers 601 and 602 are connected to the HVD BCC 610 having the internal bridge 410 enabled between the even bus 606 and the odd bus 608. Two host computers 603 and 604 are connected to the HVD BCC 612 that is configured in a split-bus mode.

Figure 7:
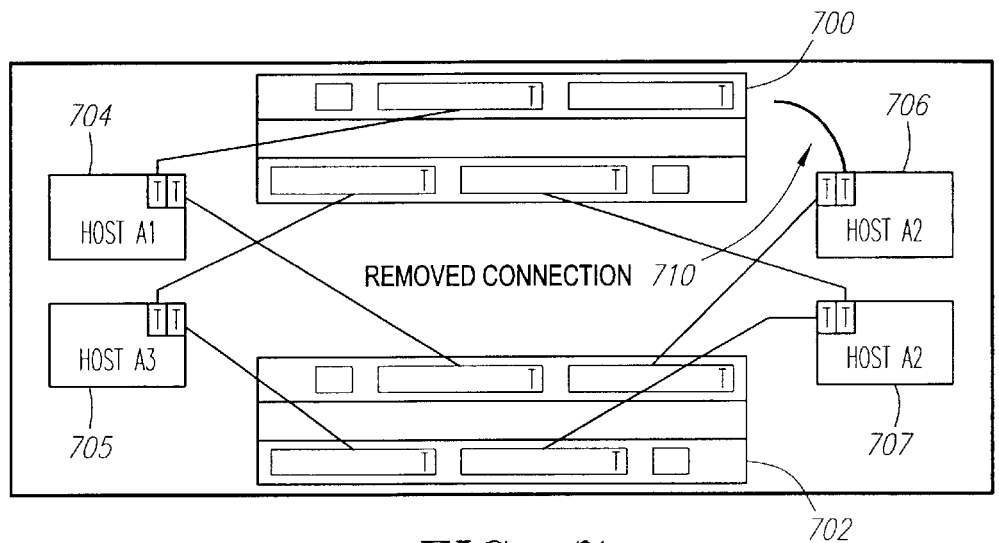
FIG. 7 is a schematic pictorial diagram that illustrates connection panels of two SCSI disk enclosures and four host computers, including interconnects and a removed connection.

Referring to FIG. 7, a schematic pictorial diagram illustrates connection panels of two SCSI disk enclosures 700 and 702, and four host computers 704, 705, 706, and 707. Interconnections show that the two SCSI disk enclosures 700 and 702 each contain two bus controller cards interconnected with mirroring so that connections between host computers and storage units (not shown) are redundant. HVD bus controller cards can be configured in split-bus or full bus mode, and connections made to the HVD BCCs can be removed or shut down without affecting the other connections. In the illustrative example, a removed connection 710 from the SCSI disk enclosure 700 to host 706 is removed without affecting other connections.

The diagram illustrates bus termination by the letter T. All SCSI buses require termination on the device at each end of the bus. Termination on the storage system occurs at BCC ports. Disk modules utilized in the storage system are connected to an internal self-terminated bus that is electrically isolated from the external bus.

Figure 8:
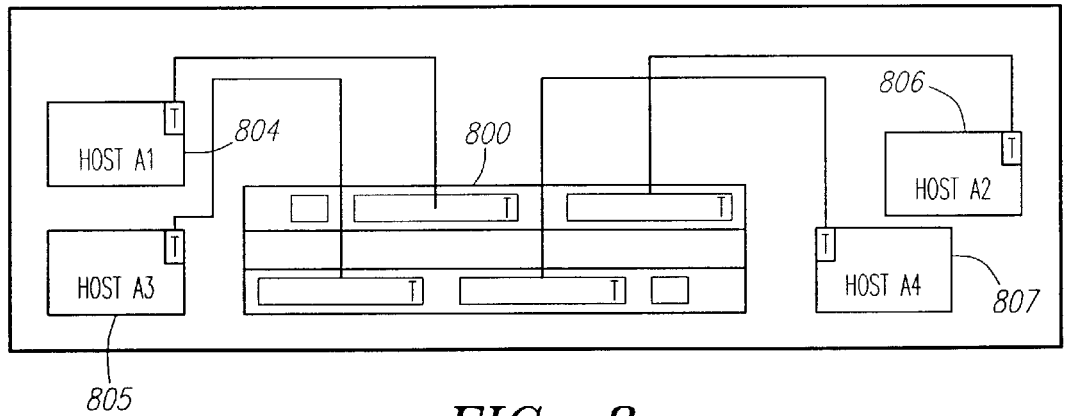
FIG. 8 is a schematic pictorial diagram that illustrates connection panels of a SCSI disk enclosure and four host computers with an increased number of host connections per enclosure.

Referring to FIG. 8, a schematic pictorial diagram illustrates connection panels of a SCSI disk enclosure 800 and four host computers 804, 805, 806, and 807. The SCSI disk enclosure 800 contains two HVD bus controller cards (not shown). Usage of two BCCs increases the number of isolated host connections. The BCCs can be configured to form a redundant connection to a single host. The interconnection depicts mirroring inside the SCSI disk enclosure 800, BCCs configured with a split bus with two hosts connected to storage through each BCC.

Figure 9:
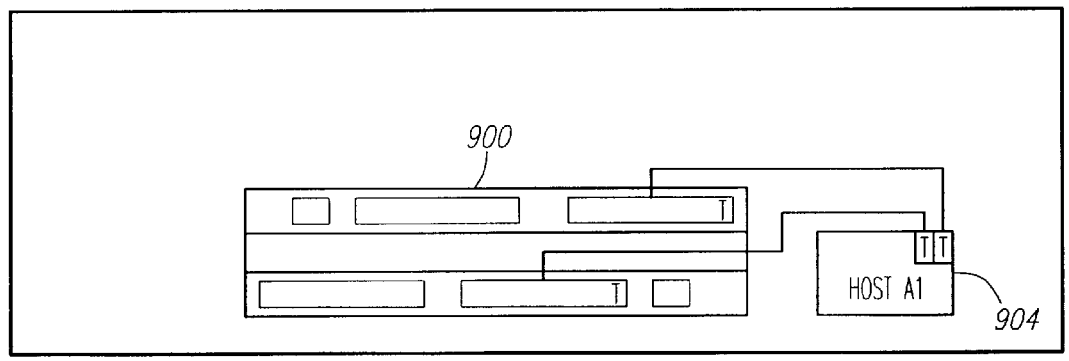
FIG. 9 is a schematic pictorial diagram illustrates connection panels of a SCSI disk enclosure and a host computer, showing a redundant connection to the single host.

Referring to FIG. 9, a schematic pictorial diagram illustrates connection panels of a SCSI disk enclosure 900 and a host computer 904, showing a redundant connection to the single host 904. The SCSI disk enclosure 900 includes two BCC slots to support redundant BCCs to a single host or to multiple hosts. The redundant connection to a single host 904 can be configured so that one BCC is active while the other is inactive, and to exchange status if desired or if problems occur along one pathway. The redundant connection to a single host can otherwise be configured to connect each independent bus, increasing performance.

Figure 10:
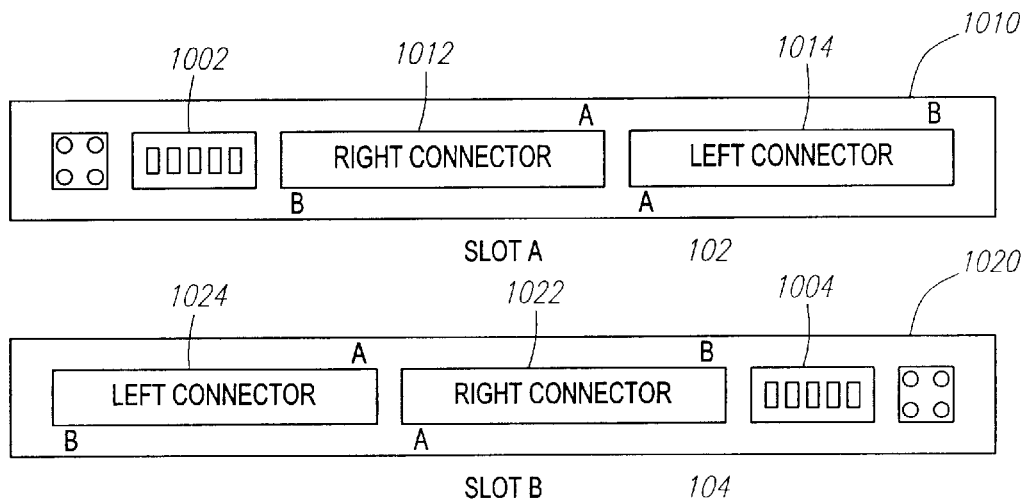
FIG. 10 is a schematic pictorial diagram showing a connection panel for the SCSI disk enclosure including left and right connectors and DIP switches.

Referring to FIG. 10, a schematic pictorial diagram illustrates a connection panel for the SCSI disk enclosure 100 including left and right connectors and dip switches. DIP switches 1002 and 1004 are used to control the configuration of the SCSI disk enclosure 100. Two BCCs are connected within the SCSI disk enclosure 100 rotated 180° with respect to one another. Stated alternatively, one BCC is inverted in comparison to the other BCC within the SCSI disk enclosure 100. Consequently, a BCC's connectors connect to the odd bus in one slot, and connect to the even bus in the second slot. Accordingly, a one-to-one relationship does not exist between the BCC connectors and the BCC DIP switches. FIG. 10 depicts the inverted orientation of the connectors 1012 and 1014 of slot A 1010 with respect to the connectors 1022 and 1024 of slot B 1020. The BCC connectors are associated with the SCSI buses and slots so that the left BCC connector is connected in slot A 1010 and associated with the even slots of SCSI bus B. The left BCC connector is connected in slot B 1020 and associated with the odd slots of SCSI bus A. The right BCC connector is connected in slot A 1010 and associated with the odd slots of SCSI bus A. The right BCC connector is connected in slot B 1020 and associated with the even slots of bus B.

Figure 11:
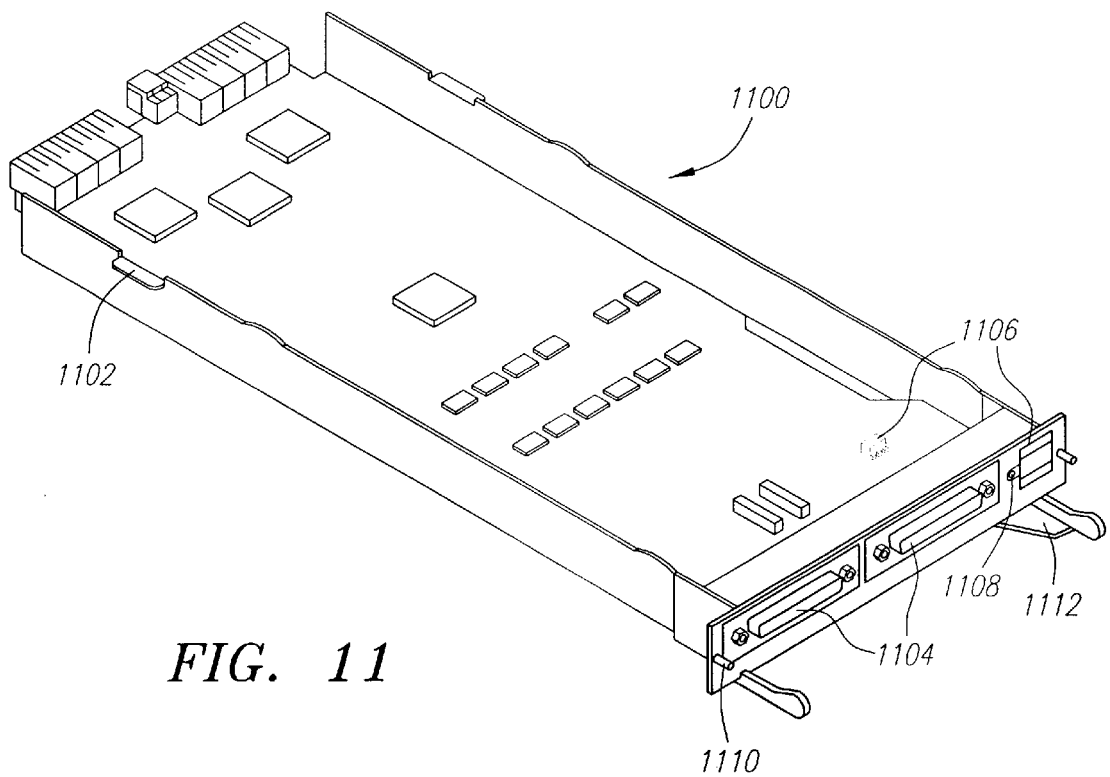
FIG. 11 is a pictorial diagram illustrating a bus controller card (BCC).

Referring to FIG. 11, a pictorial diagram illustrates a bus controller card (BCC) 1100, an electrical assembly in an open metal tray 1102. The BCC 1100 plugs into the top or bottom horizontal slot 102 or 104 shown in FIG. 1 in the SCSI disk enclosure 100. The BCC 1100 is a communication path from dual HVD host connections to SE buses inside a storage system. Each SCSI port 1104 is connected to one of two SE buses on the backplane. In full-bus mode, the buses are bridged to form a single bus of multiple disk modules. Both ports are on the same bus. In split-bus mode, port A is on one bus with odd-numbered slots, and port B is on a separate bus with even-numbered slots. Dual BCCs add redundancy and double the number of hosts that can be attached to the bus. The BCC on the bottom slot is typically the primary BCC if both cards are installed when the disk system is powered. Otherwise, the card first installed is the primary BCC. The primary BCC controls bus structure, addressing, and other options. If the primary BCC fails and is removed, the second BCC assumes the primary role. DIP switches 1106 on the front of the BCC determine full-bus or split-bus mode, high/low bus addressing, and bus termination. Five internal DIP switches 1106 specify automatic bus reset after a power failure or disk insertion.

The BCC 1100 includes LEDs 1108 indicating BCC status, bus mode, and bus activity. The BCC 1100 also includes locking screws 1110, and cam levers 1112. BCC circuitry performs various functions including bus configuration, bus isolation, expansion and conversion of the bus from HVD to SE, system fault detection, detection of BCC configuration faults, and generation of disk addresses.

In one example, the internal bridge 410 depicted in FIG. 4 can be a SYM53C140 Ultra2 SCSI Bus Expander chip that includes control and monitoring elements for implementing various configuration, isolation and diagnostic functions. The internal bridge 410 can build a table of information, such as SDTR and WDTR information, relating to devices on the bus in on-chip memory. In single-ended mode, the internal bridge 410 can perform active negation on bus drivers and input signal filtering on receivers. The internal bridge 410 can include LVD DIFFSENS receivers that detect the voltage level on the A side or the B side DIFFSENS lines to determine the transmission mode used by the buses. LVD DIFFSENS receivers are capable of detecting the voltage level of incoming SCSI signals to determine whether the attached device is a single-ended, LVD, or HVD device. The internal bridge 410 can support dynamic transmission mode changes by notifying initiators of changes in transmission mode on A side or B side segments via SCSI bus RESET. DIFFSENS line is used to detect a valid mode switch on the bus segments. After the DIFFSENS state is present for a prescribed duration, the internal bridge 410 can generate a bus reset on the opposite bus from the bus that originally changed in mode. Initiators renegotiate synchronous transfer rates with each device on that segment to ensure a valid bus segment for that mode.

Figure 12:
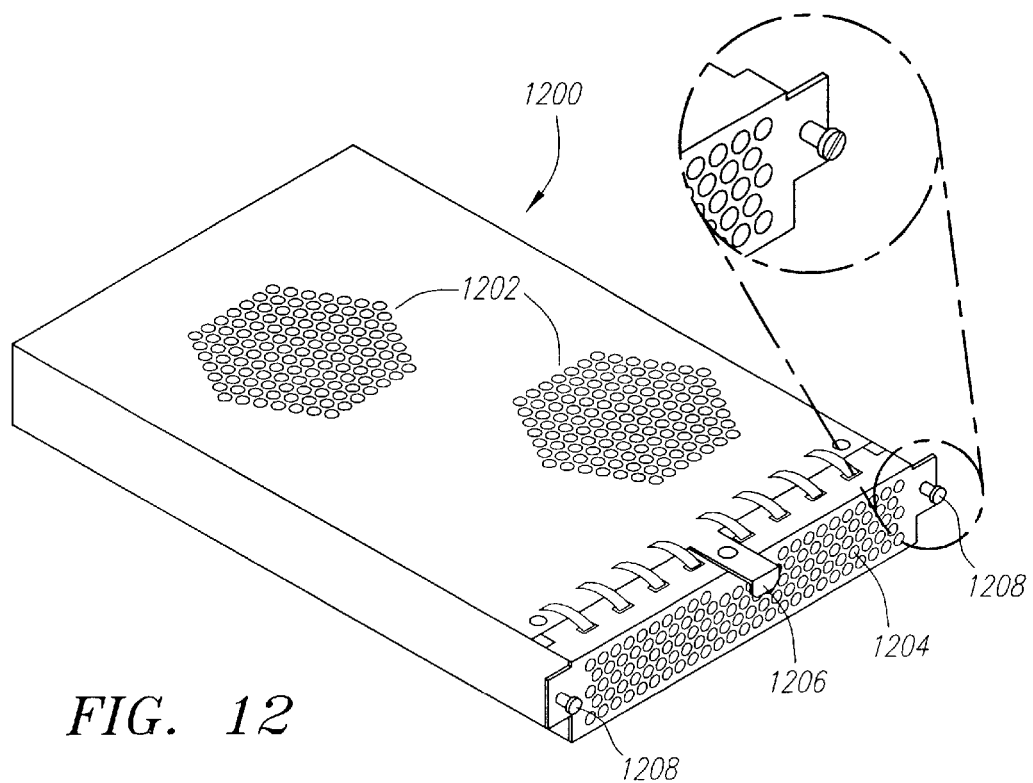
FIG. 12 is a pictorial diagram that shows a fan for insertion into the SCSI disk enclosure.

Referring to FIG. 12, a pictorial diagram illustrates a fan 1200 for insertion into the SCSI disk enclosure 100. The fan blows cooling air over system components using two internal high-speed blowers 1202. The fan 1200 includes an LED 1204, a pull tab 1206, and two locking screws 1208. Internal circuitry (not shown) senses blower motion and triggers a fault when the speed of either blower 1202 falls below a critical level, actuating the LED 1204.

Figure 13:
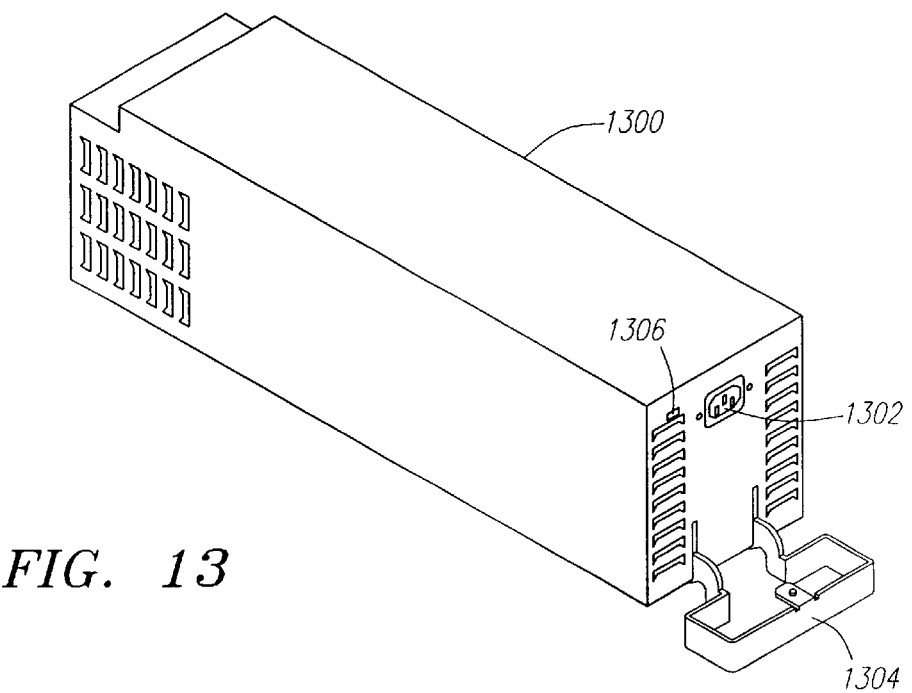
FIG. 13 is a pictorial diagram depicting a power supply for insertion into the SCSI disk enclosure.

Referring to FIG. 13, a pictorial diagram illustrates a power supply 1300 for insertion into the SCSI disk enclosure 100. A hot-pluggable 450-watt power supply converts wide-ranging AC voltage from an external main to stable DC output and delivers the voltage to the backplane. The power supply 1300 has two internal blowers (not shown), an AC receptacle 1302, a cam handle 1304 with locking screw, and an LED 1306. Internal control circuits prevent the rear DC connector from becoming energized when the power supply 1300 is removed from the SCSI disk enclosure 100.

Internal circuitry triggers a fault when a blower or other power supply component fails. The power supply LED 1306 lights to signal the fault. Blowers remain in operation if other parts fail to maintain cooling air flow through the disk system. If a blower fails, the power supply 1300 shuts down. Optional redundant power supplies share the load reciprocally. Each supply automatically increases output voltage to compensate for reduced voltage output from the other. If one power supply fails, the other delivers the entire load.

While the present invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

In the claims, unless otherwise indicated the article "a" is to refer to "one or more than one".

What is claimed is:

1. An enclosure comprising:
   a housing;
   redundant power supply slots for receiving and coupling to one or more power supplies;
   redundant fan slots for receiving and coupling to one or more fan cards; and
   redundant bus controller card slots for receiving and coupling to one or more bus controller cards, the individual redundant controller card slots having a first back plane connector for coupling to an odd bus and having a second back plane connector for coupling to an even bus, the odd bus and even bus being accessible independently through the enclosure.

2. An enclosure according to claim 1 wherein:
   the redundant bus controller card slots include a first bus controller card slot and a second bus controller card slot, the second bus controller card slot being configured to receive a card in an inverted arrangement in comparison to the orientation of a card in the first bus controller card slot.

3. An enclosure according to claim 1 wherein: the enclosure is configured to interface to a plurality of Small Computer System Interface (SCSI) buses.

4. An enclosure according to claim 1 wherein:
   the redundant bus controller card slots are configured to receive a bus controller card that has two channels for coupling to a first bus and a second bus, the two channels being connected by a bridge that can be activated to permit communication between channels and can be inactivated to isolate the two channels.

5. An enclosure according to claim 1 wherein:

the enclosure is configured for High Voltage Differential (HVD) signaling in a Small Computer System Interface (SCSI) system.

6. An enclosure according to claim 1 further comprising:

two bus controller card slots;

two power supply slots; and two fan slots.

7. An enclosure according to claim 1 wherein:

the enclosure is operational when one or more power supplies are connected to a redundant power supply slot, when one or more fan cards are connected to a redundant fan slot, and when one or more bus controller cards are connected to a bus controller card slot.

8. A storage system comprising:

one or more enclosures including:
    a housing;
    redundant power supply slots for receiving and coupling to one or more power supplies;
    one or more power supplies coupled to the redundant power supply slots;
    redundant fan slots for receiving and coupling to one or more fan cards;
    one or more fans coupled to the redundant fan slots;
    redundant bus controller card slots for receiving and coupling to one or more bus controller cards, the individual redundant controller card slots having a first back plane connector for coupling to an odd bus and having a second back plane connector for coupling to an even bus, the odd bus and even bus being accessible independently through the enclosure; and
    one or more bus controller cards coupled to the redundant bus controller card slots;
    a first bus coupled to the one or more enclosures and configured as an even bus; and
    a second bus coupled to the one or more enclosures and configured as an odd bus.

9. A storage system according to claim 8 further comprising:

a plurality of storage slots coupled to the first bus;

a plurality of storage slots coupled to the second bus;

one or more storage modules coupled to storage slots of the first bus; and one or more storage modules coupled to storage slots of the second bus.

10. A storage system according to claim 9 further comprising:

one or more host systems coupled to the bus controller cards for accessing one or more of the storage modules via communication through the bus controller cards.

11. A storage system according to claim 10 wherein:

the one or more storage modules include one or more disk storage modules.

12. A storage system according to claim 10 further comprising:

the one or more bus controller cards configured to form a redundant connection to a single host system.

13. A storage system according to claim 8 wherein:

the redundant bus controller card slots include a first bus controller card slot and a second bus controller card slot, the second bus controller card slot being configured to receive a card in an inverted arrangement in comparison to the orientation of a card in the first bus controller card slot.

14. A storage system according to claim 8 wherein:

the one or more enclosures and bus controller cards are configured to interface to a plurality of Small Computer System Interface (SCSI) buses.

15. A storage system according to claim 8 wherein:

the redundant bus controller card slots are configured to receive a bus controller card that has two channels for coupling to a first bus and a second bus, the two channels being connected by a bridge that can be activated to permit communication between channels and can be inactivated to isolate the two channels.

16. A storage system according to claim 8 wherein:

the one or more enclosures and bus controller cards are configured for High Voltage Differential (HVD) signaling in a Small Computer System Interface (SCSI) system.

17. A storage system according to claim 8 wherein the one or more enclosures further comprise:

two bus controller card slots;

two power supply slots; and two fan slots.

18. A storage system according to claim 8 wherein:

the enclosure is operational when one or more power supplies are connected to a redundant power supply slot, when one or more fan cards are connected to a redundant fan slot, and when one or more bus controller cards are connected to a bus controller card slot.

19. A storage system comprising:

one or more means for enclosing components including:
    means for storing a plurality of components;
    redundant first slot means coupled to the storing means for receiving and coupling to one or more power supplies;
    one or more power supplies coupled to the redundant first slot means;
    redundant second slot means coupled to the storing means for receiving and coupling to one or more fan cards;
    one or more fans coupled to the redundant second slot means;
    redundant third slot means coupled to the storing means for receiving and coupling to one or more bus controller cards, the individual redundant third slot means having a first back plane connection means for coupling to an odd bus and having a second back plane connection means for coupling to an even bus, the odd bus and even bus being accessible independently through the enclosure; and
    one or more means for controlling a bus coupled to the redundant third slot means;
    a first bus coupled to the one or more enclosures and configured as an even bus; and
    a second bus coupled to the one or more enclosures and configured as an odd bus.

20. A storage system according to claim 19 wherein the one or more enclosing means further comprise:

two redundant first slot means;

two redundant second slot means; and two redundant third slot means.

\* \* \* \* \*